US012559101B2

(12) United States Patent
Nakamura et al.

(10) Patent No.: US 12,559,101 B2
(45) Date of Patent: Feb. 24, 2026

(54) TRAVELING CONTROL APPARATUS

(71) Applicant: SUBARU CORPORATION, Tokyo (JP)

(72) Inventors: Akinori Nakamura, Tokyo (JP); Yoshihiro Nagao, Tokyo (JP); Tatsuya Suto, Tokyo (JP); Koki Matsumoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 82 days.

(21) Appl. No.: 18/133,068

(22) Filed: Apr. 11, 2023

(65) Prior Publication Data

US 2023/0382374 A1 Nov. 30, 2023

(30) Foreign Application Priority Data

May 27, 2022 (JP) ................................. 2022-087220

(51) Int. Cl.
B60W 30/14 (2006.01)

(52) U.S. Cl.
CPC ....... B60W 30/143 (2013.01); B60W 2540/12 (2013.01); B60W 2710/18 (2013.01); B60W 2720/10 (2013.01); B60W 2720/106 (2013.01)

(58) Field of Classification Search
CPC .................................................. B60W 30/143
See application file for complete search history.

(56) References Cited

U.S. PATENT DOCUMENTS

2015/0217768 A1* 8/2015 Fairgrieve ........... B60W 30/143
                                                    701/93
2017/0043778 A1* 2/2017 Kelly .................. B60W 30/143
2018/0050675 A1  2/2018 Stefan et al.
(Continued)

FOREIGN PATENT DOCUMENTS

JP        2013-001188 A    1/2013
JP        2016-218996 A    12/2016
(Continued)

OTHER PUBLICATIONS

Office Action issued in Japanese Application No. 2022-087220 dated Dec. 2, 2025 (including English translation).

*Primary Examiner* — Imran K Mustafa
(74) *Attorney, Agent, or Firm* — TROUTMAN PEPPER LOCKE LLP

(57) ABSTRACT

A traveling control apparatus includes a speed control processor, first and second brake command detectors, a brake control processor, and an operational state setting unit. The speed control processor controls a vehicle speed to cause a vehicle to travel at a target speed, and is switchable between an active operational state and an inactive operational state. The first brake command detector detects a first brake command based on a driver's operation. The brake control processor generates a second brake command based on an environment outside the vehicle. The second brake command detector detects the second brake command. The operational state setting unit maintains the speed control processor in the active operational state when the first brake command is generated while the speed control processor is in the active operational state, and switches the speed control processor to the inactive operational state when the second brake command is generated.

12 Claims, 4 Drawing Sheets

(56) References Cited

U.S. PATENT DOCUMENTS

| 2018/0151074 | A1  |      | 5/2018  | Noto et al. |            |
|--------------|-----|------|---------|-------------|------------|
| 2020/0409359 | A1* | 12/2020 | Kapinski | ............... | G06N 3/042 |
| 2021/0078574 | A1* | 3/2021 | Takaso | ................... | G06V 20/58 |

FOREIGN PATENT DOCUMENTS

| JP | 2017-043193 | A | 3/2017 |
|----|-------------|---|--------|
| JP | 2017-519676 | A | 7/2017 |

* cited by examiner

TRAVELING CONTROL APPARATUS

CROSS-REFERENCE TO RELATED APPLICATION

The present application claims priority from Japanese Patent Application No. 2022-087220 filed on May 27, 2022, the entire contents of which are hereby incorporated by reference.

BACKGROUND

The disclosure relates to a traveling control apparatus that performs traveling control of a vehicle.

There are some vehicles provided with speed control systems that cause the vehicles to travel at target speeds set by drivers who drive the vehicles, for example. Japanese Unexamined Patent Application Publication (Translation of PCT Application) No. 2017-519676, for example, discloses a technique that maintains a speed control system in an active operational state without switching the speed control system to an inactive operational state when a driver performs a braking operation while the speed control system is in the active operational state.

SUMMARY

An aspect of the disclosure provides a traveling control apparatus to be applied to a vehicle. The traveling control apparatus includes a speed control processor, a first brake command detector, a brake control processor, a second brake command detector, and an operational state setting unit. The speed control processor is configured to control a speed of the vehicle to cause the vehicle to travel at a target speed. The speed control processor is switchable between an active operational state and an inactive operational state. The first brake command detector is configured to detect a first brake command based on an operation performed by a driver who drives the vehicle. The brake control processor is configured to generate a second brake command based on an external environment of the vehicle. The second brake command detector is configured to detect the second brake command. The operational state setting unit is configured to maintain the speed control processor in the active operational state when the first brake command out of the first brake command and the second brake command is generated while the speed control processor is in the active operational state, and to switch the speed control processor to the inactive operational state when the second brake command is generated while the speed control processor is in the active operational state.

An aspect of the disclosure provides a traveling control apparatus to be applied to a vehicle. The traveling control apparatus includes circuitry configured to: perform speed control of the vehicle to cause the vehicle to travel at a target speed; switch the speed control of the vehicle between an active state and an inactive state; maintain the speed control of the vehicle in the active state when a first brake command out of the first brake command and a second brake command is generated while the speed control of the vehicle is in the active state; and switch the speed control of the vehicle to the inactive state when the second brake command is generated while the speed control of the vehicle is in the active state. The first brake command is based on detection of an operation performed by a driver who drives the vehicle, and the second brake command is based on detection of an external environment of the vehicle.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
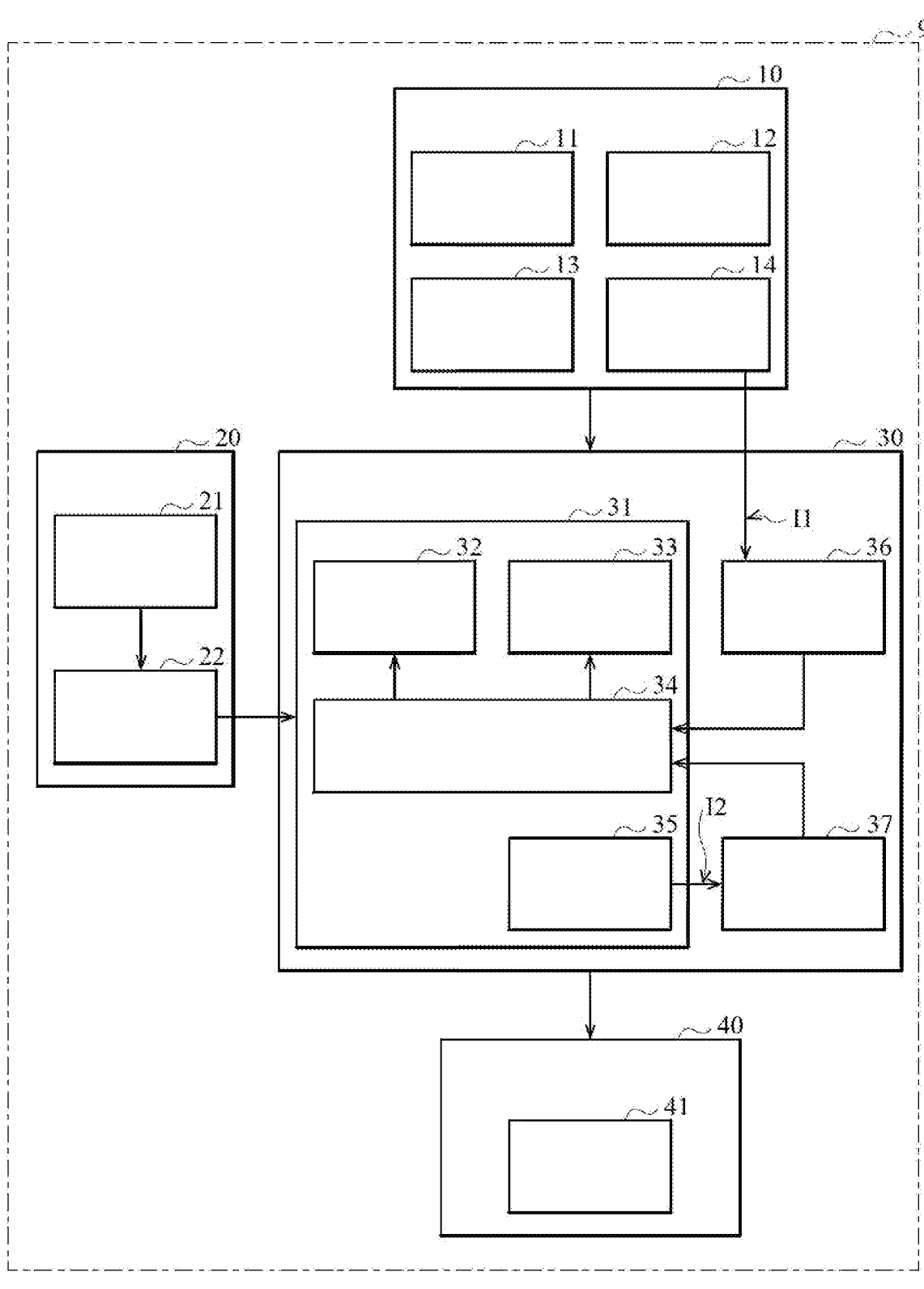
FIG. 1 is a block diagram illustrating an exemplary configuration of a vehicle including a traveling control apparatus according to one example embodiment of the disclosure.

There is a demand for enhancing safety of a vehicle, and a further improvement in the safety is expected.

It is desirable to provide a traveling control apparatus that makes it possible to enhance safety of a vehicle.

Some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

FIG. 1 illustrates an exemplary configuration of a vehicle 9 including a traveling control apparatus according to an example embodiment. The vehicle 9 may be a vehicle provided with a speed control system, and may include a driving operation unit 10, an external environment recognition unit 20, a traveling control unit 30, and a traveling mechanism unit 40.

The driving operation unit 10 may receive a driving operation performed by a driver who drives the vehicle 9. The driving operation unit 10 may include a steering wheel 11, a speed control system setting unit 12, an accelerator pedal 13, and a brake pedal 14.

The steering wheel 11 may receive a steering operation performed by the driver.

The speed control system setting unit 12 may receive an operation performed by the driver to set the speed control system.

Figure 2:
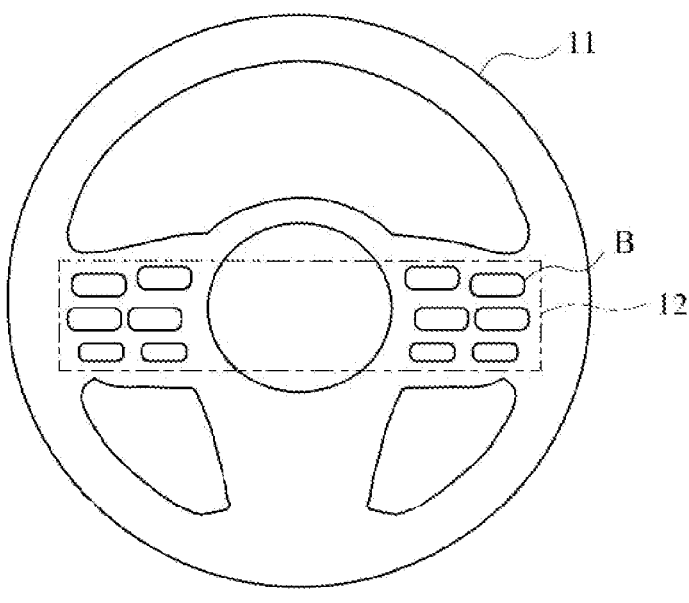
FIG. 2 is an explanatory diagram illustrating an exemplary configuration of a speed control system setting unit illustrated in FIG. 1.

FIG. 2 illustrates an exemplary configuration of the speed control system setting unit 12. In this example, the speed control system setting unit 12.

control system setting unit 12 may be provided on the steering wheel 11 to allow the driver to easily operate the speed control system setting unit 12 during driving. In this example, the speed control system setting unit 12 may include multiple buttons B. The buttons B may include, for example, a button for switching the speed control system to an active operational state, a button for switching the speed control system to an inactive operational state, a button for setting a target speed of the vehicle 9, and a button for setting the type of geography (terrain) of a region in which the vehicle 9 is traveling. Note that the speed control system setting unit 12 may include various types of user interfaces, such as a switch, a touch screen, a display, or a keypad other than the buttons B.

The accelerator pedal 13 may receive an accelerating operation performed by the driver to accelerate the vehicle 9.

The brake pedal 14 may receive a braking operation performed by the driver to apply a brake to the vehicle 9.

Note that the driving operation unit 10 may further include, for example, a shift lever, a turn signal lever, and a parking brake pedal in addition to the components described above.

The external environment recognition unit 20 may recognize an external environment of the vehicle 9. The external environment recognition unit 20 may include an imaging unit 21 and a recognition processor 22. The imaging unit 21 may capture an image of an environment in front of the vehicle 9, and may include an image sensor and a lens, for example. The recognition processor 22 may recognize the environment in front of the vehicle 9 based on the image captured by the imaging unit 21. The recognition processor 22 may recognize a preceding vehicle, a pedestrian, a bicycle, and another obstacle in front of the vehicle 9, for example.

The traveling control unit 30 may control traveling of the vehicle 9 by controlling an operation of the traveling mechanism unit 40 based on a driver's driving operation received by the driving operation unit 10 and the result of recognition by the external environment recognition unit 20. The traveling control unit 30 may include one or more electronic control units (ECUs), for example. The traveling control unit 30 may include a driver assistance control unit 31 and a brake command detectors 36 and 37.

The driver assistance control unit 31 may assist the driver in driving the vehicle 9 based on the result of recognition by the external environment recognition unit 20. The driver assistance control unit 31 and the external environment recognition unit 20 may constitute a driver assistance system. The driver assistance control unit 31 may include a high-speed speed control processor 32, a low-speed speed control processor 33, an operational state setting unit 34, and a brake control processor 35.

The high-speed speed control processor 32 and the low-speed speed control processor 33 may be control units of the speed control system, and may cause the speed of the vehicle 9 to reach a target speed set by the driver.

The high-speed speed control processor 32 may be configured to be easy to perform the speed control when the speed of the vehicle 9 is 50 km per hour or higher, for example. The high-speed speed control processor 32 may be operatable while the vehicle 9 is traveling without causing frequent oscillations and repeated stopping, e.g., while the vehicle 9 is traveling on a highway. The speed control system setting unit 12 described above may include, for example, a button for switching the high-speed speed control processor 32 to an active operational state, a button for switching the high-speed speed control processor 32 to an inactive operational state, and a button for setting a target speed of the vehicle 9 to the high-speed speed control processor 32.

The low-speed speed control processor 33 may be configured to easy to perform the speed control when the speed of the vehicle 9 is lower than 50 km per hour, for example. The low-speed speed control processor 33 may be operatable while the vehicle 9 is traveling on a road other than a highway or traveling off-road, for example. The speed control system setting unit 12 described above may include, for example, a button for switching the low-speed speed control processor 33 to an active operational state, a button for switching the low-speed speed control processor 33 to an inactive operational state, and a button for setting a target speed of the vehicle 9 to the low-speed speed control processor 33.

The operational state setting unit 34 set operational states of the high-speed speed control processor 32 and the low-speed speed control processor 33. The operational state setting unit 34 may set operational states of the high-speed speed control processor 32 and the low-speed speed control processor 33 based on an operation performed by the driver on the speed control system setting unit 12, for example. Further, the operational state setting unit 34 may set operational states of the high-speed speed control processor 32 and the low-speed speed control processor 33 based on an operation performed by the driver on the brake pedal 14 or the results of detection by various sensors that are mounted on the vehicle 9 to detect a traveling state of the vehicle 9.

When the driver operates the button for switching the high-speed speed control processor 32 to the active operational state while the vehicle 9 is traveling on a highway, for example, the operational state setting unit 34 may switch the high-speed speed control processor 32 from the inactive operational state to the active operational state. This may cause the high-speed speed control processor 32 to control the speed of the vehicle 9 so that the speed of the vehicle 9 reaches the target speed. Thereafter, when the driver operates the brake pedal 14, for example, the operational state setting unit 34 may switch the high-speed speed control processor 32 from the active operational state to the inactive operational state. Thereafter, the traveling control unit 30 may cause the vehicle 9 to travel at a speed set based on a driver's operation on the accelerator pedal 13 or the brake pedal 14. When the driver wants to switch the speed control system back to the active state again, the driver may operate the button for switching the high-speed speed control processor 32 to the active operational state. This may cause the operational state setting unit 34 to switch the high-speed speed control processor 32 from the inactive operational state to the active operational state. Further, when slipping of a wheel of the vehicle 9 is detected, for example, the operational state setting unit 34 may switch the high-speed speed control processor 32 to the inactive operational state.

For example, when the driver operates the button for switching the low-speed speed control processor 33 to the active operational state while the vehicle 9 is traveling on a road other than a highway, the operational state setting unit 34 may switch the low-speed speed control processor 33 from the inactive operational state to the active operational state. This may cause the low-speed speed control processor 33 to control the speed of the vehicle 9 so that the speed of the vehicle 9 reaches the target speed. Thereafter, when the driver operates the brake pedal 14, for example, the operational state setting unit 34 may maintain the low-speed speed control processor 33 in the active operational state, unlike the case of the high-speed speed control processor 32. Further, the operational state setting unit 34 may switch the low-speed speed control processor 33 from the active operational state to the inactive operational state when the brake control processor 35 to be described later activates a pre-crash brake, for example. Furthermore, when the sensor mounted on the vehicle 9 detects slipping of a wheel of the vehicle 9, for example, the operational state setting unit 34 may maintain the low-speed speed control processor 33 in the active operational state.

In this example, the operational state setting unit 34 may maintain the low-speed speed control processor 33 in the active operational state when the driver operates the brake pedal 14. Note that, in this case, whether to maintain the low-speed speed control processor 33 in the active operational state or switch the low-speed speed control processor 33 from the active operational state to the inactive operational state may be set in advance by the driver by operating the speed control system setting unit 12, for example. Further, in this example, the low-speed speed control processor 33 may be switched from the active operational state to the inactive operational state when the brake control processor 35 activates the pre-crash brake. Note that, in this case, whether to switch the low-speed speed control processor 33 from the active operational state to the inactive operational state or to maintain the low-speed speed control processor 33 in the active operational state may be set in advance by the driver by operating the speed control system setting unit 12, for example.

The brake control processor 35 may apply a brake to the vehicle 9 by activating the pre-crash brake based on the result of recognition by the external environment recognition unit 20. For example, if the result of recognition by the external environment recognition unit 20 indicates a possibility of contact between the vehicle 9 and an obstacle present in front of the vehicle 9, the brake control processor 35 may activate the pre-crash brake to avoid the possible contact.

The brake command detector 36 detects a brake command I1 generated when the driver operates the brake pedal 14. Further, the brake command detector 36 may notify the operational state setting unit 34 about the detection of the brake command I1.

The brake command detector 37 detects a brake command I2 generated when the brake control processor 35 activates the pre-crash brake. Further, the brake command detector 37 may notify the operational state setting unit 34 about the detection of the brake command I2.

Based on the brake commands I1 and I2 detected by the brake command detectors 36 and 37, the traveling control unit 30 may control an operation of a brake device 41 (to be described later) of the traveling mechanism unit 40.

The traveling mechanism unit 40 may include, for example, an engine, a transmission mechanism, a steering mechanism, a brake mechanism, and wheels. The traveling mechanism unit 40 may operate in accordance with a command from the traveling control unit 30. Operating the traveling mechanism unit 40 may cause the vehicle 9 to travel in accordance with a driver's driving operation received by the driving operation unit 10.

The traveling mechanism unit 40 may include the brake device 41. The brake device 41 may include a brake disk, for example. The brake device 41 may apply a brake to the vehicle 9 in accordance with a command from the traveling control unit 30.

In one embodiment, the low-speed speed control processor 33 may serve as a "speed control processor". In one embodiment, the brake command detector 36 may serve as a "first brake command detector". In one embodiment, the brake control processor 35 may serve as a "brake control processor". In one embodiment, the brake command detector 37 may serve as a "second brake command detector". In one embodiment, the operational state setting unit 34 may serve as a "operational state setting unit". In one embodiment, the traveling control unit 30 may serve as a "traveling control apparatus".

Next, operations and workings of the traveling control unit 30 according to the present example embodiment are described.

First, an exemplary operation of the vehicle 9 is described with reference to FIG. 1. The driving operation unit 10 may receive a driving operation performed by a driver who drives the vehicle 9. The external environment recognition unit 20 may recognize an external environment of the vehicle 9. The traveling control unit 30 may control traveling of the vehicle 9 by controlling an operation of the traveling mechanism unit 40 based on the driver's driving operation received by the driving operation unit 10 and the result of recognition by the external environment recognition unit 20. The driver assistance control unit 31 of the traveling control unit 30 may assist the driver in driving the vehicle 9 based on the result of recognition by the external environment recognition unit 20. In the driver assistance control unit 31, the high-speed speed control processor 32 and the low-speed speed control processor 33 cause the speed of the vehicle 9 to reach a target speed set in advance by the driver. The operational state setting unit 34 sets operational states of the high-speed speed control processor 32 and the low-speed speed control processor 33. The brake control processor 35 applies a brake to the vehicle 9 by activating the pre-crash brake based on the result of recognition by the external environment recognition unit 20. The brake command detector 36 detects the brake command I1 generated when the driver operates the brake pedal 14. The brake command detector 37 detects the brake command I2 generated when the brake control processor 35 activates the pre-crash brake. The traveling mechanism unit 40 may operate in accordance with a command from the traveling control unit 30. Operating the traveling mechanism unit 40 may cause the vehicle 9 to travel in accordance with a driver's driving operation received by the driving operation unit 10.

Figure 3:
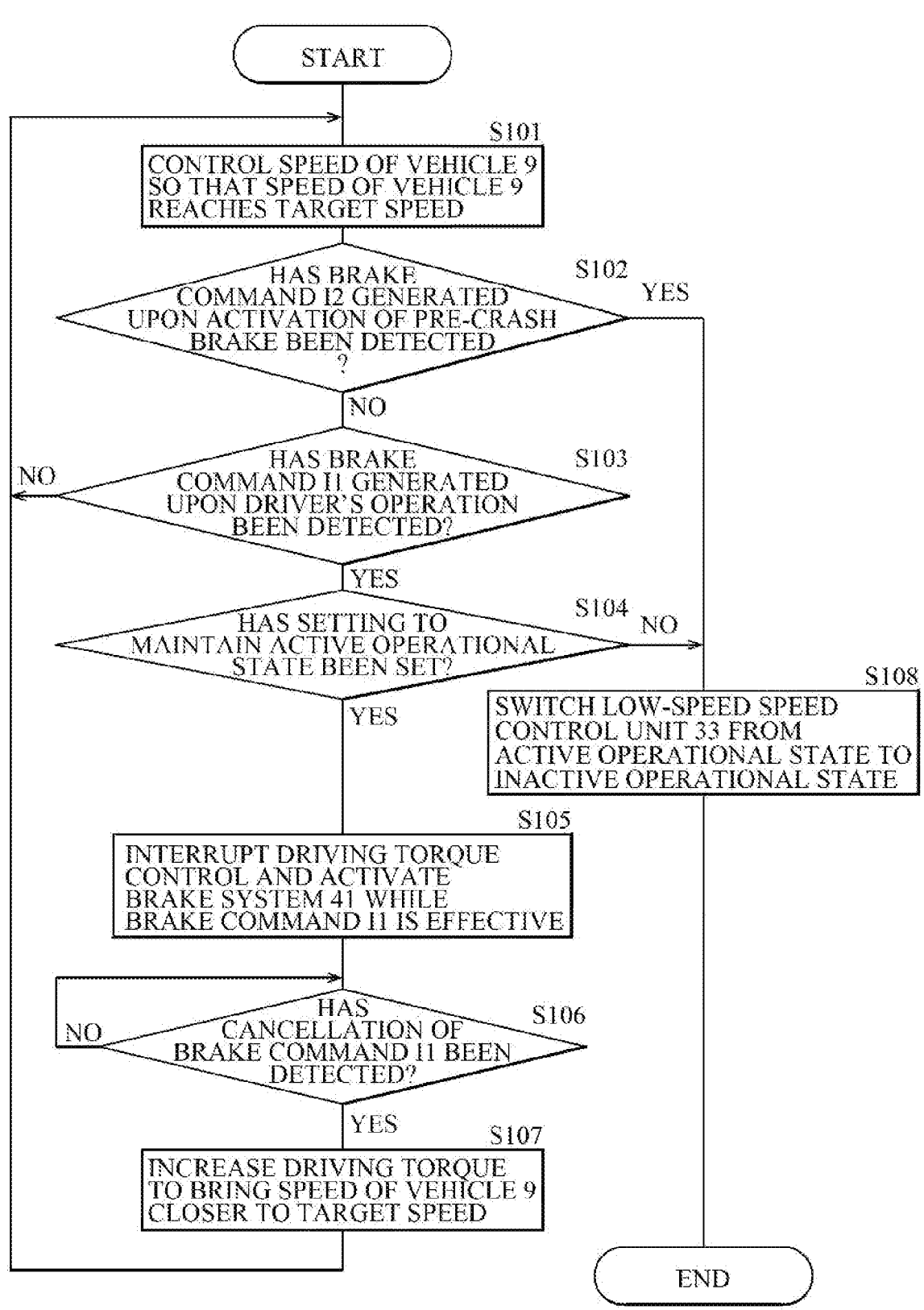
FIG. 3 is a flowchart illustrating an exemplary operation of a traveling control unit illustrated in FIG. 1.

FIG. 3 illustrates an exemplary operation of the traveling control unit 30 to be performed while the low-speed speed control processor 33 is in the active operational state.

The low-speed speed control processor 33 may control the speed of the vehicle 9 to cause the speed of the vehicle 9 to reach the target speed (Step S101). For example, the low-speed speed control processor 33 may control driving torques of the engine and the transmission mechanism of the traveling mechanism unit 40 or control a braking operation of the brake device 41 of the traveling mechanism unit 40 so that the speed of the vehicle 9 reaches the target speed. The speed of the vehicle 9 may be thereby controlled so as to reach the target speed, and may be maintained at the target speed.

Thereafter, the brake command detector 37 may confirm whether the brake command I2 generated upon activation of the pre-crash brake has been detected (Step S102).

If it is not determined in Step S102 that the brake command I2 has been detected (Step S102: NO), the brake command detector 36 may confirm whether the brake command I1 generated upon the driver's operation has been detected (Step S103). If the brake command I1 has not been detected (Step S103: NO), the process may return to Step S101.

If it is determined in Step S103 that the brake command I1 has been detected (Step S103: YES), the operational state setting unit 34 may confirm whether a setting to maintain the low-speed speed control processor 33 in the active operational state when the driver operates the brake pedal 14 has been set (Step S104). That is, in this example, whether to maintain the low-speed speed control processor 33 in the active operational state or to switch the low-speed speed control processor 33 from the active operational state to the inactive operational state when the driver operates the brake pedal 14 may be set in advance by the driver by operating the speed control system setting unit 12, as described above. The operational state setting unit 34 may confirm whether the setting to maintain the low-speed speed control processor 33 in the active operational state has been set.

If it is determined in Step S104 that the setting to maintain the low-speed speed control processor 33 in the active operational state has been set (Step S104: YES), the low-speed speed control processor 33 may interrupt the control of the driving torques of the engine and the transmission mechanism in the traveling mechanism unit 40, and may control a braking operation of the brake device 41 of the traveling mechanism unit 40 (Step S105). That is, the low-speed speed control processor 33 maintained in the active operational state may interrupt the control of the driving torques and may control the braking operation of the brake device 41 of the traveling mechanism unit 40 in accordance with the driver's operation on the brake pedal 14. The vehicle 9 may be thereby decelerated and, for example, stopped.

Thereafter, the brake command detector 36 may confirm whether cancellation of the brake command I1 has been detected (Step S106). For example, the brake command I1 may be cancelled when the driver takes his/her foot off the brake pedal 14, and then the brake command detector 36 may detect the cancellation of the brake command I1. If the cancellation of the brake command I1 has not been detected yet (Step S106: NO), the brake command detector 36 may repeat the process at Step S106 until the cancellation of the brake command I1 is detected.

If it is determined in Step S106 that the cancellation of the brake command I1 has been detected (Step S106: YES), the low-speed speed control processor 33 may increase the driving torques of the engine and the transmission mechanism in the traveling mechanism unit 40 to bring the speed of the vehicle 9 closer to the target speed (Step S107). That is, when the driver takes his/her foot off the brake pedal 14 to cancel the brake command I1, the low-speed speed control processor 33 maintained in the active operational state may cause the speed of the vehicle 9 to reach the target speed. The process may then return to Step S101.

If it is determined in Step S102 that the brake command I2 has been detected (Step S102: YES) or if it is determined in Step S104 that a setting to switch the active operational state to the inactive operational state has been set (Step S104: NO), the operational state setting unit 34 may switch the low-speed speed control processor 33 from the active operational state to the inactive operational state (Step S108). In this manner, the traveling control unit 30 may control the operation of the traveling mechanism unit 40 based on the driver's operation on the accelerator pedal 13 and the driver's operation on the brake pedal 14, for example.

The flow may thereby end.

As described above, the traveling control unit 30 includes the low-speed speed control processor 33, the brake command detector 36, the brake control processor 35, the brake command detector 37, and the operational state setting unit 34. The low-speed speed control processor 33 controls the speed of the vehicle 9 to cause the vehicle 9 to travel at the target speed and is switchable between the active operational state and the inactive operational state. The brake command detector 36 detects the brake command I1 based on an operation performed by the driver. The brake control processor 35 generates the brake command I2 based on the external environment of the vehicle 9. The brake command detector 37 detects the brake command I2. The operational state setting unit 34 maintains the low-speed speed control processor 33 in the active operational state when the brake command I1 out of the brake commands I1 and I2 is generated while the low-speed speed control processor 33 is in the active operational state, and switches the low-speed speed control processor 33 to the inactive operational state when the brake command I2 is generated while the low-speed speed control processor 33 is in the active operational state.

Accordingly, the brake command I2 may be generated when the pre-crash brake is activated, for example, and the operational state setting unit 34 switches the low-speed speed control processor 33 from the active operational state to the inactive operational state. The traveling control unit 30 thereby enhances safety.

If the pre-crash brake is activated and the low-speed speed control processor 33 is maintained in the active operational state, the vehicle 9 can be braked and stopped based on the brake command I2 generated upon the activation of the pre-crash brake. At this time, the low-speed speed control processor 33 is in the active operational state. Thus, in a case where the brake command I1 is cancelled by the driver by, for example, taking off his/her foot from the brake pedal 14, and where the brake command I2 generated upon the activation of the pre-crash brake is cancelled after the vehicle 9 is stopped, the vehicle 9 can start automatically traveling and accelerating toward the target speed. Activating the pre-crash brake can make the driver feel flustered. In addition, as the pre-crash brake can be operated when the vehicle 9 has a possibility of making contact with an obstacle present around the vehicle 9, there are some cases where the possible contact with the obstacle cannot be avoided after the vehicle 9 starts traveling. Thus, safety can be decreased when the vehicle 9 starts automatically traveling after the pre-crash brake is activated. In contrast, according to the traveling control unit 30, when the pre-crash brake is activated, the operational state setting unit 34 switches the low-speed speed control processor 33 from the active operational state to the inactive operational state. The traveling control unit 30 thereby prevents the vehicle 9 from starting automatically traveling when the brake commands I1 and I2 are cancelled after the vehicle 9 is stopped, for example. It is therefore possible to enhance safety.

Further, in a case where the pre-crash brake is not activated and where the driver operates the brake pedal 14, for example, the brake command I1 out of the brake commands I1 and I2 may be generated. Thus, the operational state setting unit 34 may maintain the low-speed speed control processor 33 in the active operational state. Accordingly, when the driver takes his/her foot off the brake pedal 14 after the vehicle 9 is braked and stopped, for example, the vehicle 9 may start automatically traveling and accelerating toward the target speed. The traveling control unit 30 thus makes it possible to enhance convenience of the driver.

If the low-speed speed control processor 33 is switched to the inactive operational state when the driver operates the brake pedal 14, the driver has to operate the button for switching the low-speed speed control processor 33 to the active operational state, which makes the driver feel troublesome. In contrast, the traveling control unit 30 maintains the low-speed speed control processor 33 in the active operational state, which saves the driver from having to operate the button for switching the low-speed speed control processor 33 to the active operational state. Accordingly, the traveling control unit 30 makes it possible to enhance the convenience of the driver.

According to the example embodiment described above, the low-speed speed control processor, the brake command detector 36, the brake control processor, the brake command detector 37, and the operational state setting unit are provided. The low-speed speed control processor controls the speed of the vehicle to cause the vehicle to travel at the target speed and is switchable between the active operational state and the inactive operational state. The brake command detector 36 detects the brake command based on the driver's operation. The brake control processor generates the brake command I2 based on the external environment of the vehicle. The brake command detector 37 detects the brake command I2. The operational state setting unit maintains the low-speed speed control processor in the active operational state when the brake command I1 out of the brake commands I1 and I2 is generated while the low-speed speed control processor is in the active operational state, and switches the low-speed speed control processor to the inactive operational state when the brake command I2 is generated while the low-speed speed control processor 33 is in the active operational state. Accordingly, it is possible to enhance safety.

In the example embodiment described above, the vehicle 9 may be provided with the driver assistance system; however, this is a non-limiting example. According to a modification example, the vehicle 9 may be provided with an automatic driving system instead of the driver assistance system. The modification example is described in detail below.

Figure 4:
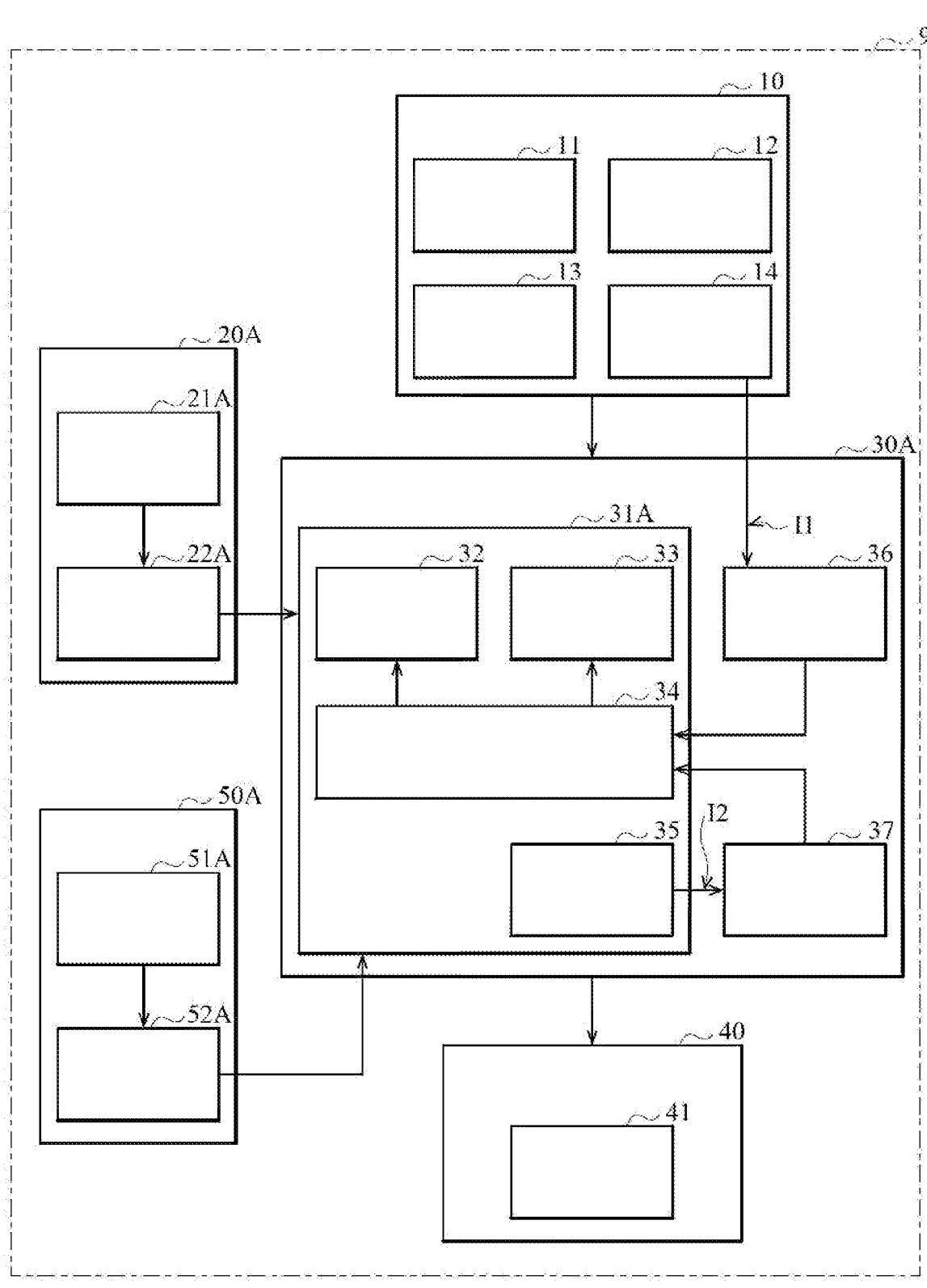
FIG. 4 is a block diagram illustrating an exemplary configuration of a vehicle including a traveling control apparatus according to a modification example.

FIG. 4 illustrates an exemplary configuration of the vehicle 9 according to the modification example. The vehicle 9 may include the driving operation unit 10, an external environment recognition unit 20A, a traveling route setting unit 50A, a traveling control unit 30A, and the traveling mechanism unit 40.

The external environment recognition unit 20A may include an imaging unit 21A and a recognition processor 22A. The imaging unit 21A may capture an image of a surrounding environment of the vehicle 9. The imaging unit 21A may include, for example, an imaging unit that captures an image of an environment in front of the vehicle 9, an imaging unit that captures an environment on a side of the vehicle 9, and an imaging unit that captures an environment behind the vehicle 9. The recognition processor 22A may recognize the surrounding environment of the vehicle 9 based on the images captured by the imaging unit 21A. Note that the external environment recognition unit 20A is not limited to this example and may further include various sensors such as a radar device. The external environment recognition unit 20A may recognize the surrounding environment of the vehicle 9 using the results of detection by these sensors.

The traveling route setting unit 50A may determine a route to a destination (a scheduled traveling route) on which the vehicle 9 is to travel. The traveling route setting unit 50A may include a global navigation satellite system (GNSS) receiver 51A and a processor 52A. The GNSS receiver 51A may acquire a position of the vehicle 9 on the ground using a GNSS such as the global positioning system (GPS). The processor 52A may set the scheduled traveling route of the vehicle 9 using a map information database including road map information. For example, the processor 52A may include a memory that stores the map information database, and may set the scheduled traveling route using the map information database stored in the memory. Alternatively, the processor 52A may include a communicator that communicates with a network server storing the map information data base, for example, and may set the scheduled traveling route based on the information acquired from the network server. The traveling route setting unit 50A may include, for example, a user interface such as a display panel, a touch panel, or various buttons. Based on the information on the destination input by the driver by operating the user interface, for example, the traveling route setting unit 50A may set the scheduled traveling route to the destination.

The traveling control unit 30A may include an automatic driving control unit 31A. The automatic driving control unit 31A may control an operation of the traveling mechanism unit 40 based on the result of recognition by the external environment recognition unit 20A to thereby cause the vehicle 9 to travel along the scheduled traveling route set by the traveling route setting unit 50A. The automatic driving control unit 31A, the external environment recognition unit 20A, and the traveling route setting unit 50A may constitute the automatic driving system. As in the example embodiment described above, the automatic driving control unit 31A may include the high-speed speed control processor 32, the low-speed speed control processor 33, the operational state setting unit 34, and the brake control processor 35.

As in the example embodiment described above, the operational state setting unit 34 maintains the low-speed speed control processor 33 in the active operational state when the brake command I1 out of the brake commands I1 and I2 is generated while the low-speed speed control processor 33 is in the active operational state, and switches the low-speed speed control processor 33 to the inactive operational state when the brake command I2 is generated while the low-speed speed control processor 33 is in the active operational state. The traveling control unit 30A thereby makes it possible to enhance safety.

Although the disclosure has been described with reference to the example embodiments and modification examples described above, the disclosure should not be limited thereto, and various modifications may be made.

For example, the traveling control unit 30 may operate according to the flowchart illustrated in FIG. 3 in the above description; however, the flowchart is a mere example, and the traveling control unit 30 may operate according to another flowchart.

One or more of the low-speed speed control processor 33, the brake command detector 36, the brake control processor 35, the brake command detector 37, and the operational state setting unit 34 illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the low-speed speed control processor 33, the brake command detector 36, the brake control processor 35, the brake command detector 37, and the operational state setting unit 34 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the low-speed speed control processor 33, the brake command detector 36, the brake control processor 35, the brake command detector 37, and the operational state setting unit 34 illustrated in FIG. 1.

The invention claimed is:

1. A traveling control apparatus to be applied to a vehicle, the traveling control apparatus comprising:
    a processor; and
    a memory storing instructions for causing the processor to:
        perform a start control of the vehicle to cause the vehicle to start traveling automatically from a stopped state;
        perform speed control of the vehicle to cause the vehicle to travel at a target speed, the speed control of the vehicle including the start control of the vehicle;
        switch the speed control of the vehicle between an active state and an inactive state;
        maintain the speed control of the vehicle in the active state when a first brake command out of the first brake command and a second brake command is generated while the speed control of the vehicle is in the active state, the first brake command being based on detection of an operation performed by a driver who drives the vehicle,
        switch the speed control of the vehicle to the inactive state when the second brake command is generated while the speed control of the vehicle is in the active state, the second brake command being based on detection of an activation of a pre-crash brake, the pre-crash brake being activated based on a result of recognition of an external environment of the vehicle; and
        switch the speed control of the vehicle to the inactive state before the vehicle stops, in response to the second brake command being generated while the speed control of the vehicle is in the active state.

2. The traveling control apparatus according to claim 1, wherein the processor is configured to control an operation of a brake device to apply a brake to the vehicle or stop the vehicle based on the first brake command or the second brake command.

3. The traveling control apparatus according to claim 1, wherein the processor is configured to cause the vehicle to travel at a speed set based on the operation performed by the driver when both of the first brake command and the second brake command are cancelled while the speed control processor is in the inactive state.

4. The traveling control apparatus according to claim 2, wherein the processor is configured to cause the vehicle to travel at a speed set based on the operation performed by the driver when both of the first brake command and the second brake command are cancelled while the speed control processor is in the inactive state.

5. The traveling control apparatus according to claim 1, wherein the processor is configured to accelerate the vehicle to cause the speed of the vehicle to reach the target speed when the first brake command is cancelled while the speed control processor is in the active state.

6. The traveling control apparatus according to claim 2, wherein the processor is configured to accelerate the vehicle to cause the speed of the vehicle to reach the target speed when the first brake command is cancelled while the speed control processor is in the active state.

7. A traveling control apparatus to be applied to a vehicle, the traveling control apparatus comprising
    circuitry configured to
        perform a start control of the vehicle to cause the vehicle to start traveling automatically from a stopped state,
        perform speed control of the vehicle to cause the vehicle to travel at a target speed, the speed control of the vehicle including the start control of the vehicle,
        switch the speed control of the vehicle between an active state and an inactive state,
        maintain the speed control of the vehicle in the active state when a first brake command out of the first brake command and a second brake command is generated while the speed control of the vehicle is in the active state, the first brake command being based on detection of an operation performed by a driver who drives the vehicle,
        switch the speed control of the vehicle to the inactive state when the second brake command is generated while the speed control of the vehicle is in the active state, the second brake command being based on detection of an activation of a pre-crash brake, the pre-crash brake being activated based on a result of recognition of an external environment of the vehicle, and
        switch the speed control of the vehicle to the inactive state before the vehicle stops, in response to the second brake command being generated while the speed control of the vehicle is in the active state.

8. The traveling control apparatus according to claim 1, wherein the speed control of the vehicle comprising a high-speed speed control of the vehicle and a low-speed speed control of the vehicle.

9. The traveling control apparatus according to claim 1, wherein the speed control of the vehicle is a low-speed speed control of the vehicle, the processor is further configured to:
    detect whether the driver who drives the vehicle has set a setting indicating maintaining the low-speed speed control in the active state;
    in response to the setting by the driver being detected, maintain the speed control of the vehicle in the active state when the first brake command is generated while the speed control of the vehicle is in the active state; and
    in response to the setting by the driver not being detected, not switch the speed control of the vehicle to the inactive state when the first brake command is generated while the speed control of the vehicle is in the active state.

10. The traveling control apparatus according to claim 7, wherein the speed control of the vehicle comprising a high-speed speed control of the vehicle and a low-speed speed control of the vehicle.

11. The traveling control apparatus according to claim 7, wherein the speed control of the vehicle is a low-speed speed control of the vehicle, the circuitry is further configured to:

detect whether the driver who drives the vehicle has set a setting indicating maintaining the low-speed speed control in the active state;

in response to the setting by the driver being detected, maintain the speed control of the vehicle in the active state when the first brake command is generated while the speed control of the vehicle is in the active state; and in response to the setting by the driver not being detected, not switch the speed control of the vehicle to the inactive state when the first brake command is generated while the speed control of the vehicle is in the active state.

12. A vehicle comprising circuitry configured to:

perform a start control of the vehicle to cause the vehicle to start traveling automatically from a stopped state;

detect a first brake command, the first brake command being generated when a driver who drives the vehicle operates a brake pedal of the vehicle;

recognize an external environment of the vehicle;

perform a pre-crash brake control that applies a brake to the vehicle automatically based on the recognized external environment of the vehicle;

detect a second brake command, the second brake command being generated in response to performing of the pre-crash brake control;

perform speed control of the vehicle to cause the vehicle to travel at a target speed automatically, the speed control of the vehicle including the start control of the vehicle;

switch the speed control of the vehicle between an active state and an inactive state;

receive an operation performed by the driver, the operation being for inputting information regarding the speed control of the vehicle, the information indicating a setting indicating that the circuitry maintains the speed control of the vehicle in the active state in response to generation of the first brake command;

store the information in response to receiving the operation;

determine whether the first brake command is detected while the speed control of the vehicle is in the active state;

in response to determining that the first brake command is detected, determine whether the stored information indicates the setting;

in response to determining that the stored information indicates the setting, maintain the speed control of the vehicle in the active state;

in response to determining that the stored information does not indicate the setting, switch the speed control of the vehicle to the inactive state; and in response to detecting the second brake command while the speed control of the vehicle is in the active state, switch the speed control of the vehicle to the inactive state before the vehicle stops, regardless of (i) whether the stored information indicates the setting, and (ii) whether the first braking command is detected.

* * * * *